United States Patent
Oizumi (10) Patent No.: US 7,619,652 B2
(45) Date of Patent: Nov. 17, 2009

(54) FRAME PROCESSING AND FRAME PROCESSING METHOD

(75) Inventor: Ken Oizumi, Tokyo (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 586 days.

(21) Appl. No.: 11/176,356

(22) Filed: Jul. 8, 2005

(65) Prior Publication Data
US 2006/0007339 A1    Jan. 12, 2006

(30) Foreign Application Priority Data
Jul. 9, 2004    (JP) .............................. 2004-203069

(51) Int. Cl.
H04N 2/225    (2006.01)
G06K 9/00    (2006.01)
(52) U.S. Cl. .................................... 348/207.1; 382/167
(58) Field of Classification Search ................. 382/167, 382/255, 274, 165; 348/207.1
See application file for complete search history.

(56) References Cited

U.S. PATENT DOCUMENTS

| 6,201,893 | B1* | 3/2001 | Shiraiwa et al. ............. 382/167 |
| 7,190,845 | B2 | 3/2007 | Iida |
| 2003/0031375 | A1* | 2/2003 | Enomoto .................... 382/255 |
| 2003/0194143 | A1 | 10/2003 | Iida |

FOREIGN PATENT DOCUMENTS

| CN | 1447276 A | 10/2003 |
| JP | 9-134439 A | 5/1997 |
| JP | 10-248024 A | 9/1998 |
| JP | 2001-203910 A | 7/2001 |
| KR | 2002-80560 A | 10/2002 |

* cited by examiner

Primary Examiner—Tuan V Ho
Assistant Examiner—Selam T Gebriel
(74) Attorney, Agent, or Firm—Foley & Lardner LLP (57) ABSTRACT

A picture frame input from an electronic camera is stored in an input-end buffer frame, and read therefrom in a CPU, where it is processed, using a reconstruction table defining a pixelwise image reconstruction and using a correction parameter defining a pixelwise brightness correction, having resultant data stored in an output-end frame buffer, where a corresponding picture frame is reconstructed to be output to a display.

10 Claims, 11 Drawing Sheets

INPUT-END FRAME BUFFER 102    Xmax_in=400; x_in=0 to 399
                               Ymax_in=300; y_in=0 to 299

|  | x_in=0 | x_in=1 | x_in=2 | ... | x_in=399 |
|---|---|---|---|---|---|
| y_in=0 | adr_in=0<br>color_in=($R_0$, $G_0$, $B_0$) | adr_in=1<br>color_in=($R_1$, $G_1$, $B_1$) | adr_in=2<br>color_in=($R_2$, $G_2$, $B_2$) |  | adr_in=399<br>color_in=($R_{399}$, $G_{399}$, $B_{399}$) |
| y_in=1 | adr_in=400<br>color_in=($R_{400}$, $G_{400}$, $B_{400}$) | adr_in=401<br>color_in=($R_{401}$, $G_{401}$, $B_{401}$) | adr_in=402<br>color_in=($R_{402}$, $G_{402}$, $B_{402}$) |  | adr_in=799<br>color_in=($R_{799}$, $G_{799}$, $B_{799}$) |
| y_in=298 | adr_in=119,200<br>color_in=($R_{119,200}$, $G_{119,200}$, $B_{119,200}$) | adr_in=119,201<br>color_in=($R_{119,201}$, $G_{119,201}$, $B_{119,201}$) | adr_in=119,202<br>color_in=($R_{119,202}$, $G_{119,202}$, $B_{119,202}$) |  | adr_in=119,599<br>color_in=($R_{119,599}$, $G_{119,599}$, $B_{119,599}$) |
| y_in=299 | adr_in=119,600<br>color_in=($R_{119,600}$, $G_{119,600}$, $B_{119,600}$) | adr_in=119,601<br>color_in=($R_{119,601}$, $G_{119,601}$, $B_{119,601}$) | adr_in=119,602<br>color_in=($R_{119,602}$, $G_{119,602}$, $B_{119,602}$) |  | adr_in=119,999<br>color_in=($R_{119,999}$, $G_{119,999}$, $B_{119,999}$) |

FIG.3

RECONSTRUCTION TABLE 104t

| adr_out=0<br>adr_in=(0) | adr_out=1<br>adr_in=(1) | adr_out=2<br>adr_in=(2) | adr_out=399<br>adr_in=(399) |
| adr_out=400<br>adr_in=(400) | adr_out=401<br>adr_in=(401) | adr_out=402<br>adr_in=(402) | adr_out=799<br>adr_in=(799) |
| adr_out=119,200<br>adr_in=(119,200) | adr_out=119,201<br>adr_in=(119,201) | adr_out=119,202<br>adr_in=(119,202) | adr_out=119,599<br>adr_in=(119,599) |
| adr_out=119,600<br>adr_in=(119,600) | adr_out=119,601<br>adr_in=(119,601) | adr_out=119,602<br>adr_in=(119,602) | adr_out=119,999<br>adr_in=(119,999) |

FIG.4

BRIGHTNESS CORRECTION PARAMETER TABLE 107t

| adr_in=0<br>"a"=(200) | adr_in=1<br>"a"=(200) | adr_in=2<br>"a"=(200) | ... | adr_in=399<br>"a"=(200) |
|---|---|---|---|---|
| adr_in=400<br>"a"=(200) | adr_in=401<br>"a"=(201) | adr_in=402<br>"a"=(205) | ... | adr_in=799<br>"a"=(200) |
| ⋮ | ⋮ | ⋮ | | ⋮ |
| adr_in=119,200<br>"a"=(200) | adr_in=119,201<br>"a"=(201) | adr_in=119,202<br>"a"=(210) | ... | adr_in=119,599<br>"a"=(200) |
| adr_in=119,600<br>"a"=(200) | adr_in=119,601<br>"a"=(200) | adr_in=119,602<br>"a"=(200) | ... | adr_in=119,999<br>"a"=(200) |

FIG.5

OUTPUT-END FRAME BUFFER 105     Xmax_out=400; x_out=0 to 399
                                Ymax_out=300; y_out=0 to 299

|  | x_out=0 | x_out=1 | x_out=2 | ... | x_out=399 |
|---|---|---|---|---|---|
| y_out=0 | adr_out=0<br>color_out=(R$_0$, G$_0$, B$_0$) | adr_out=1<br>color_out=(R$_1$, G$_1$, B$_1$) | adr_out=2<br>color_out=(R$_2$, G$_2$, B$_2$) | ... | adr_out=399<br>color_out=(R$_{399}$, G$_{399}$, B$_{399}$) |
| y_out=1 | adr_out=400<br>color_out=(R$_{400}$, G$_{400}$, B$_{400}$) | adr_out=401<br>color_out=(R$_{401}$, G$_{401}$, B$_{401}$) | adr_out=402<br>color_out=(R$_{402}$, G$_{402}$, B$_{402}$) | ... | adr_out=799<br>color_out=(R$_{799}$, G$_{799}$, B$_{799}$) |
| ⋮ | ⋮ | ⋮ | ⋮ | | ⋮ |
| y_out=298 | adr_out=119,200<br>color_out=(R$_{119,200}$, G$_{119,200}$, B$_{119,200}$) | adr_out=119,201<br>color_out=(R$_{119,201}$, G$_{119,201}$, B$_{119,201}$) | adr_out=119,202<br>color_out=(R$_{119,202}$, G$_{119,202}$, B$_{119,202}$) | ... | adr_out=119,599<br>color_out=(R$_{119,599}$, G$_{119,599}$, B$_{119,599}$) |
| y_out=299 | adr_out=119,600<br>color_out=(R$_{119,600}$, G$_{119,600}$, B$_{119,600}$) | adr_out=119,601<br>color_out=(R$_{119,601}$, G$_{119,601}$, B$_{119,601}$) | adr_out=119,602<br>color_out=(R$_{119,602}$, G$_{119,602}$, B$_{119,602}$) | ... | adr_out=119,999<br>color_out=(R$_{119,999}$, G$_{119,999}$, B$_{119,999}$) |

FRAME PROCESSING AND FRAME PROCESSING METHOD

BACKGROUND OF THE INVENTION

1. Field of the Invention

The present invention relates to a frame processing system and a frame processing method configured to process a frame of picture (hereinafter called "picture frame" or "frame"), and more particularly to a frame processing system and a frame processing method configured to process a picture frame and adaptive for use in a vehicle.

2. Description of Relevant Art

Japanese Patent Application Laid-Open Publication No. 10-248024 has disclosed a picture frame processing system for a vehicle.

The picture frame processing system is configured to store a picture frame input from a vehicle-mounted electronic camera in an input-end frame buffer, to reconstruct the stored frame by means of a frame reconstruction table, and to store the reconstructed frame as a frame to be output in an output-end frame buffer.

SUMMARY OF THE INVENTION

The frame processing system is configured to uniformly reconstruct the brightness of an output picture frame in its entirety based on a local brightness of an input frame.

As such, the local brightness of the input frame affects the output picture frame in its entirety so that the output picture frame is entirely made excessively bright or dark, thereby failing to obtain a desirable picture quality in some cases.

Further, adopting a super-wide-angle lens in an electronic camera results in an insufficient amount of light at an edge of the lens so that the picked-up picture is made darker at a peripheral portion than at a central portion. When the frame of such a picture is processed based on the brightness at its central portion, the reconstructed picture frame is also made dark at its peripheral portion, thereby making it difficult to obtain a desirable picture quality over an output picture frame.

The present invention has been made with such points of view.

It is therefore an object of the present invention to provide a frame processing system and a frame processing method capable of avoiding such a situation where the local brightness of an input frame affects an output picture frame in its entirety so that the output picture frame is entirely made excessively bright or dark to fail to obtain a desirable picture quality, thereby enabling obtainment of an output picture frame which is easy to view accordingly.

To achieve the object, according to an aspect of the invention, a frame processing system comprises: an interface configured to input a first picture frame from an electronic camera; a picture frame processor configured to reconstruct at least part of the first picture frame into a second picture frame, making a pixelwise correction of brightness; and another interface configured to output at least part of the second picture frame to a display.

To achieve the object described, according to another aspect of the invention, a frame processing method comprises: inputting a first picture frame from an electronic camera; reconstructing at least part of the first picture frame into a second picture frame, making a pixelwise correction of brightness; and outputting at least part of the second picture frame to a display.

BRIEF DESCRIPTION OF THE ACCOMPANYING DRAWINGS

The above and further objects, features, and advantages of the present invention will appear more fully from the detailed description of the preferred embodiments, when the same is read in conjunction with the accompanying drawings, in which.

DETAILED DESCRIPTION OF THE PREFERRED EMBODIMENTS

There will be detailed below the preferred embodiments of the present invention, with reference to the accompanying drawings.

First Embodiment

There will be explained a frame processing system according to a first embodiment of the present invention with reference to FIGS. 1 through 6.

Figure 1:
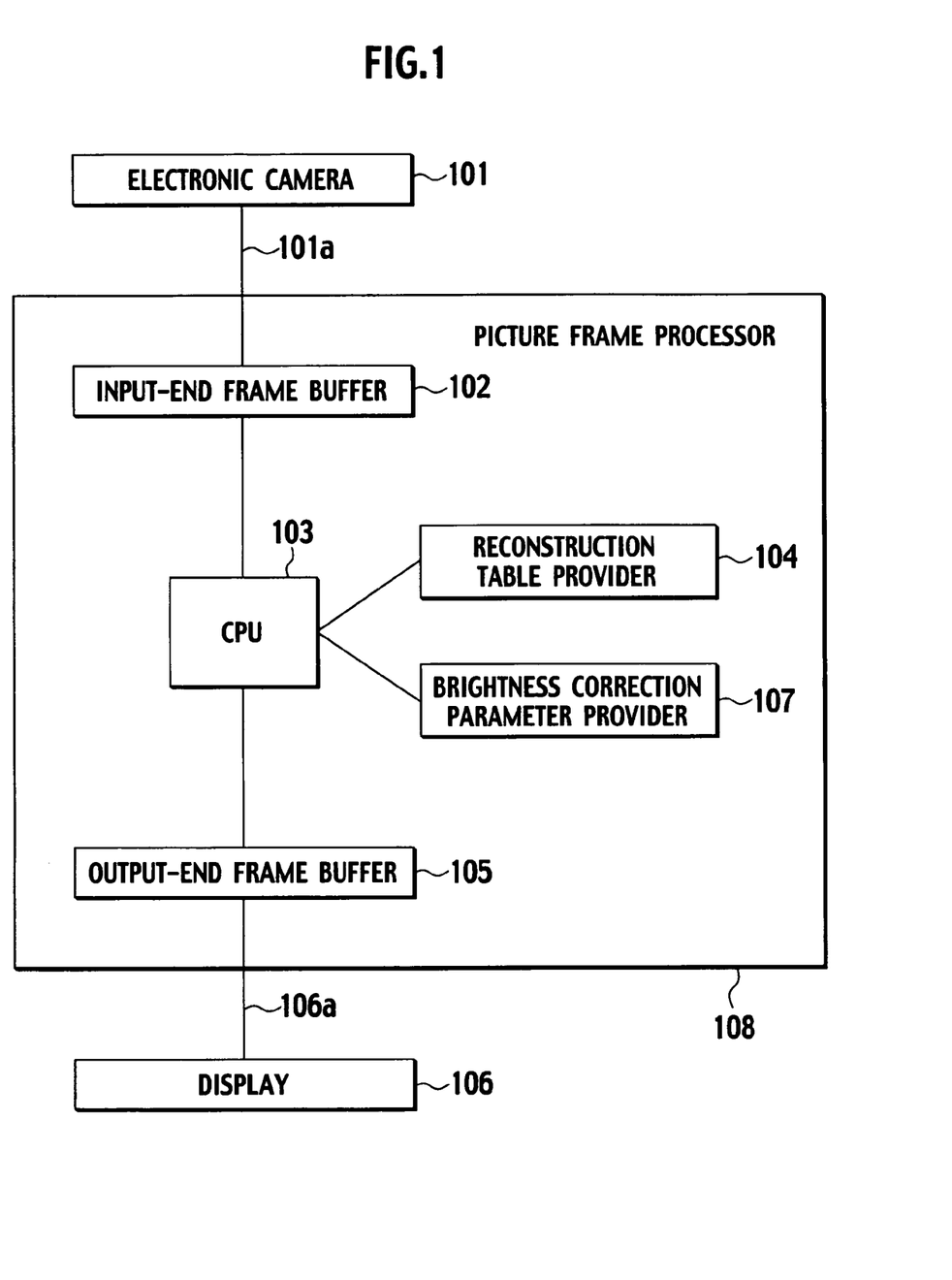
FIG. 1 is a block diagram of a frame processing system according to a first embodiment of the invention.

As shown in FIG. 1, the frame processing system includes: an input interface 101a configured to input a set of data on whole pixels of a picked-up picture by a vehicle-mounted electronic camera 101, as a picture frame; a frame processor 108 configured to process at least part of the picture frame input via the interface 101a, for a reconstruction thereof into a picture frame of an adaptive format to a vehicle-mounted display 106, with a pixelwise brightness correction inclusive; and an output interface 106a configured to output at least part of the picture frame thus reconstructed, to the display 106. The interfaces 101a, 106a may each be a suitable signal transfer line, circuit, or communication system.

The picture frame processor 108 includes: an input-end frame buffer 102 connected to the input interface 101a; a CPU 103 connected to the input-end frame buffer 102; a reconstruction table provider 104 connected to the CPU 103; a brightness correction parameter provider 107 connected to the CPU 103; and an output-end frame buffer 105 connected to the CPU 103 and the output interface 106a.

The input-end frame buffer 102 is configured to hold data of pixels of at least part of the picture frame input from the input interface 101a, at corresponding addresses in a prescribed buffer region.

The reconstruction table provider 104 is composed of a memory having stored therein a reconstruction table 104t configured to define a rule for the reconstruction, as an inter-buffer permutation map consisting of a matrix of pairs of input-end and output-end buffer addresses.

The brightness correction parameter provider 107 is composed of a memory having stored therein a brightness correction parameter table 107t consisting of a matrix of brightness correction parameters each representing the degree of a correction of brightness of a corresponding pixel in a frame of picture held in the input-end frame buffer 102. It is noted that the picture frame held in the input-end frame buffer 102 is also referred to as an "input picture frame" to the buffer 102.

The CPU 103 is configured to sequentially read image and brightness data of pixels of the picture frame held in the input-end frame buffer 102, and to pixelwise process read data by using a corresponding address pair read from the reconstruction table 104t and a corresponding brightness correction parameter read from the brightness correction parameter table 107t, having a combination of resultant image and brightness data output to be stored as a pixel data at a corresponding address in a prescribed buffer region of the output-end frame buffer 105.

The output-end frame buffer 105 thus has generated therein a brightness-corrected reconstructed picture frame of the picture frame held in the input-end frame buffer 102, and at least part of the reconstructed picture frame is output via the output interface 106a to the display 106.

Figure 2:
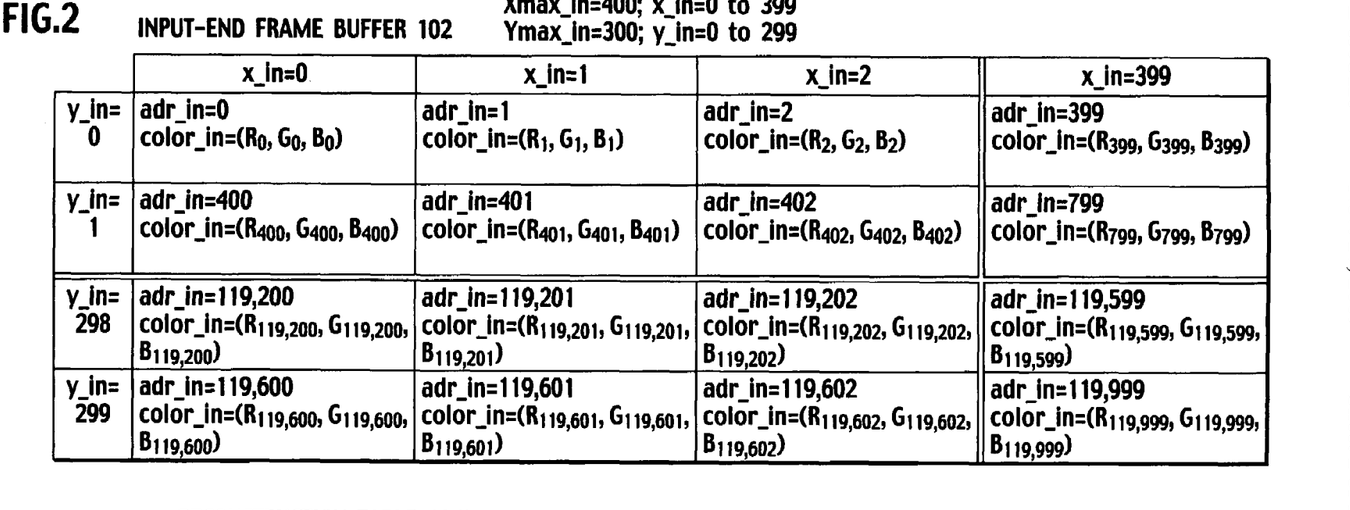
FIG. 2 is an allocation table of pixel data stored in an input-end frame buffer of a picture frame processor of the frame processing system shown in FIG. 1.

As illustrated in FIG. 2, the input-end frame buffer 102 has a function to store a picture frame input from the electronic camera 101 in an internal memory, via input processing. The input processing in this respect is known in the field of digital processing of picture frame, and thus the details thereof are omitted.

The input-end frame buffer 102 has a buffer region consisting of buffer elements in a matrix of $Y_{max\_in}$ rows by $X_{max\_in}$ columns. The buffer elements hold therein pixel data of a picture frame, respectively, and thus are each called "pixel" sometimes hereinafter. Concerning the input-end frame buffer 102, the location of each pixel (hereinafter sometimes called "input pixel") of an input picture frame is defined by a combination of a horizontal coordinate $x_{\_in}$ (ranging from 0 to $(X_{max\_in}-1)$) corresponding to a column number of the buffer element, and a vertical coordinate $y_{\_in}$ (ranging from 0 to $(Y_{max\_in}-1)$) corresponding to a row number of the buffer element. It is assumed herein that $X_{max\_in}=400$, $x_{\_in}=0$ to 399, and $Y_{max\_in}=300$, $Y_{\_in}=0$ to 299.

Each input pixel has a color data or pixel data color$_{\_in}$ ($R_{\_in}$, $G_{\_in}$, $B_{\_in}$) in an RGB format, where $R_{\_in}$, $G_{\_in}$, and $B_{\_in}$ are each an 8-bit integer, and an input pixel represented by coordinates ($x_{\_in}$, $y_{\_in}$) has an address adr$_{\_in}$ which is given by an equation: adr$_{\_in}$=$x_{\_in}$+$y_{\_in}$×$X_{max\_in}$. Each pixel data color$_{\_in}$ in the input-end frame buffer 102 can be accessed by using its address adr$_{\_in}$ given in the above manner.

Figure 3:
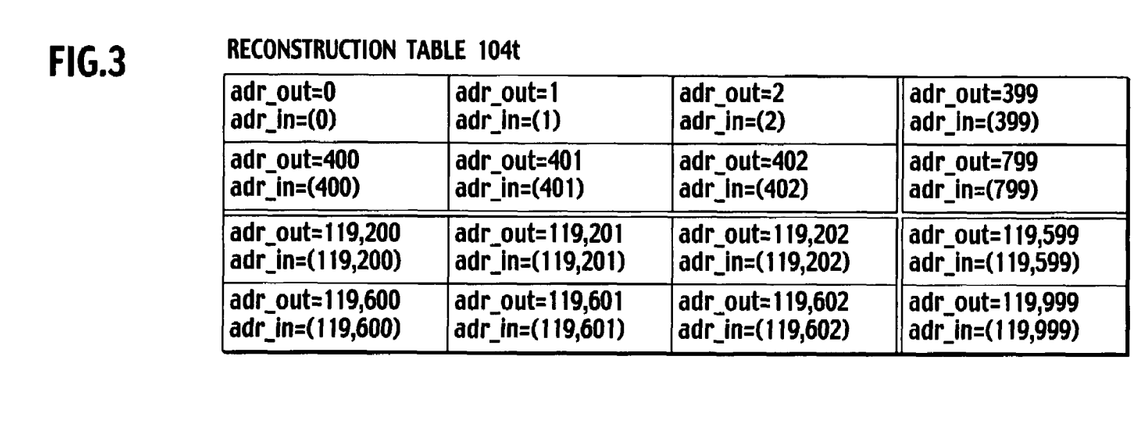
FIG. 3 is an allocation table of address pairs in a reconstruction table stored in a reconstruction table provider of the picture frame processor shown in FIG. 1.

As illustrated in FIG. 3, the reconstruction table provider 104 stores therein the reconstruction table 104t consisting of a matrix of look-up cells corresponding to buffer elements (hereinafter sometimes called "output pixels") of the output-end frame buffer 105, respectively. Each look-up cell stores therein an address adr$_{\_in}$ for accessing to the corresponding input pixel in the input-end frame buffer 102. Each look-up cell of the reconstruction table 104t is accessed by an address adr$_{\_out}$ for accessing to the corresponding output pixel of the output-end frame buffer 105.

Figure 4:
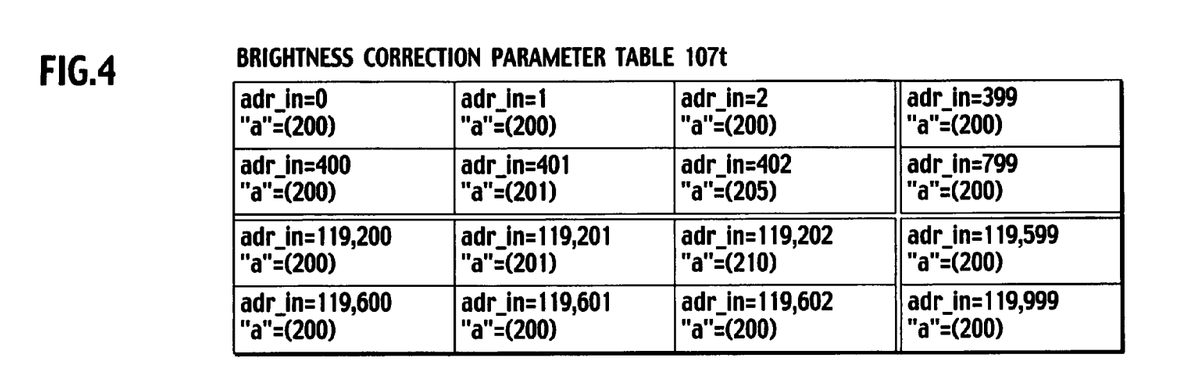
FIG. 4 is an allocation table of parameters in a brightness correction parameter table stored in a brightness correction parameter provider of the picture frame processor shown in FIG. 1.

As illustrated in FIG. 4, the brightness correction parameter provider 107 has the brightness correction parameter table 107t including look-up cells corresponding to pixels of the input-end frame buffer 102, respectively, and each look-up cell is given a prescribed brightness correction parameter "a" provided in an 8-bit integer. The present invention conducts brightness correction, by the parameter "a". It is possible to access to each brightness correction parameter "a", by using a corresponding argument address adr$_{\_in}$ passed from the CPU 103.

Figure 5:
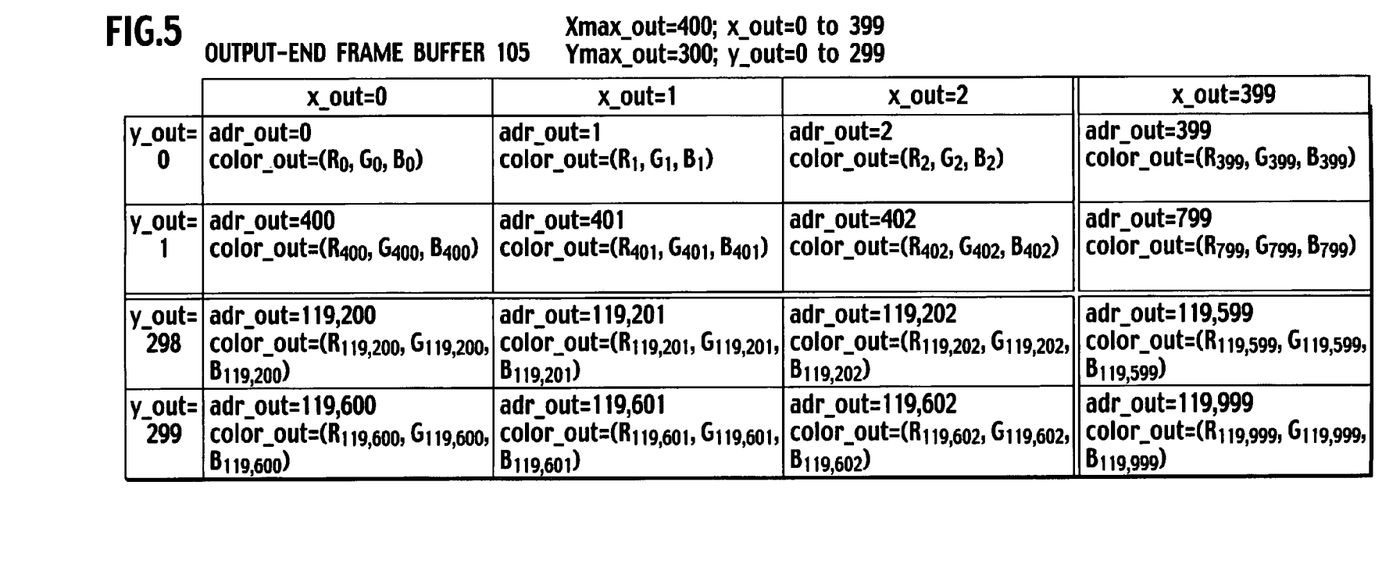
FIG. 5 is an allocation table of pixel data stored in an output-end frame buffer of the picture frame processor shown in FIG. 1.

As illustrated in FIG. 5, the output-end frame buffer 105 includes output pixels in a matrix of $Y_{max\_out}$ rows by $X_{max\_out}$ columns. Each output pixel has a location defined by a combination of a horizontal coordinate $x_{\_out}$ (ranging from 0 to $(X_{max\_out}-1)$) corresponding to a column number of the pixel, and a vertical coordinate $y_{\_out}$ (ranging from 0 to $(Y_{max\_out}-1)$) corresponding to a row number of the pixel. It is assumed herein that $X_{max\_out}=400$, $x_{\_out}=0$ to 399, and $Y_{max\_out}=300$, $y_{\_out}=0$ to 299.

Each output pixel has a color data or pixel data color$_{\_out}$ ($R_{\_out}$, $G_{\_out}$, $B_{\_out}$) in an RGB format, where $R_{\_out}$, $G_{\_out}$, and $B_{\_out}$ are each an 8-bit integer, and an output pixel represented by coordinates ($x_{\_out}$, $y_{\_out}$) has an address adr$_{\_out}$ which is given by an equation: adr$_{\_out}$=$x_{\_out}$+$y_{\_out}$×$X_{max\_out}$. Each pixel data color$_{\_out}$ in the output-end frame buffer 105 can be accessed by using its address adr$_{\_out}$ given in the above manner.

The CPU 103 is configured to use an address adr$_{\_out}$ of an output pixel represented by coordinates ($x_{\_out}$, $y_{\_out}$) to thereby access to a corresponding look-up cell in the reconstruction table 104t, thereby acquiring an address adr$_{\_in}$ in the input-end frame buffer 102 as a look-up destination. The CPU 103 is further configured to: use the thus obtained address adr$_{\_in}$ to obtain a pixel data color$_{\_in}$ of an input picture frame from the input-end frame buffer 102; use a corresponding brightness correction parameter "a" obtained from the brightness correction parameter table 107t of the brightness correction parameter provider 107 to correct the brightness of the pixel data color$_{\_in}$, thereby acquiring a pixel data color$_{\_out}$; and set the pixel data color$_{\_out}$ as a value of the output pixel in the output-end frame buffer 105 represented by the coordinates ($x_{\_out}$, $y_{\_out}$).

The CPU 103 repeatedly conducts the same processing for all pixels of the output-end frame buffer 105 to store an output picture frame in its entirety in the output-end frame buffer 105, and then terminates its pertinent control actions.

There will be explained an example of correction where the CPU 103 pixelwise corrects a brightness of pixel data color$_{\_in}$ by using a corresponding brightness correction parameter "a". Each pixel data color$_{\_in}$ consists of R, G, and B values which are represented by $R_{\_in}$, $G_{\_in}$, $B_{\_in}$, respectively. Brightness correction is conducted by the following calculation, and the calculation result is regarded as a pixel data color$_{out}$, and "a" represents a value of a brightness correction parameter "a":

$R_{out}=(R_{in}\times 255)/a$; or $R_{out}=255$ when $(R_{in}\times 255)/a$ has a value of 255 or more;

$G_{out}=(G_{in}\times 255)/a$; and $G_{out}=255$ when $(G_{in}\times 255)/a$ has a value of 255 or more; and $B_{out}=(B_{in}\times 255)/a$; and $B_{out}=255$ when $(B_{in}\times 255)/a$ has a value of 255 or more.

There will be explained a calculation example for the equation $R_{out}=(R_{in}\times 255)/a$.

$R_{in}$ is a brightness of primary red represented by an 8-bit integer ranging from 0 to 255 (0 is the darkest, and 255 is the brightest).

For example, when the $R_{in}$ has a value of 200 and the brightness correction parameter (which is also an 8-bit integer) has a value of 180, $R_{out}=(200\times 255)/180=283$. However, since the solution for the $R_{out}$ has a value larger than 256 in this case, $R_{out}=255$ as noted above. In this way, the $R_{out}$ is determined to have a value of 255, when the solution for the $R_{out}$ has exceeded a value of 255 corresponding to the maximum brightness, in case of acquiring the $R_{out}$ by correcting the value of a corresponding $R_{in}$ toward a brighter side.

Note that the values $X_{max\_in}$ and $Y_{max\_in}$ of the input-end frame buffer 102 shown in FIG. 2 are equal to the values $X_{max\_out}$ and $Y_{max\_out}$ of the output-end frame buffer 105 shown in FIG. 5, respectively, so that the adr$_{out}$ is equal to the adr$_{in}$ in each look-up cell of the reconstruction table 104$t$ shown in FIG. 3. However, the values $X_{max\_in}$, $Y_{max\_in}$, $X_{max\_out}$, and $Y_{max\_out}$ are changed depending on an aspect ratio of a pixel matrix of an adopted picture frame input device and an aspect ratio of a pixel matrix of an adopted picture frame output device, so that the adr$_{out}$ is not necessarily equal to the adr$_{in}$ in each look-up cell of the reconstruction table 104$t$. For example, when a pixel matrix of a picture frame input device is smaller than a pixel matrix of a picture frame output device, pixels of the picture frame input device correspond to pixels of the picture frame output device in an appropriately overlapped manner and at an appropriate aspect ratio. Contrary, when a pixel matrix of a picture frame input device is larger than a pixel matrix of a picture frame output device, pixels of the picture frame input device correspond to pixels of the picture frame output device in an appropriately skipped or diminished manner and at an appropriate aspect ratio. This is also the case for the input-end frame buffer 102 of FIG. 2 and the output-end frame buffer 105 of FIG. 5, such that the value of the address adr$_{in}$ stored in each look-up cell of the reconstruction table 104$t$ shown in FIG. 3 is commensurately changed when part of an input picture frame is to be enlargedly displayed, for example.

Figure 6:
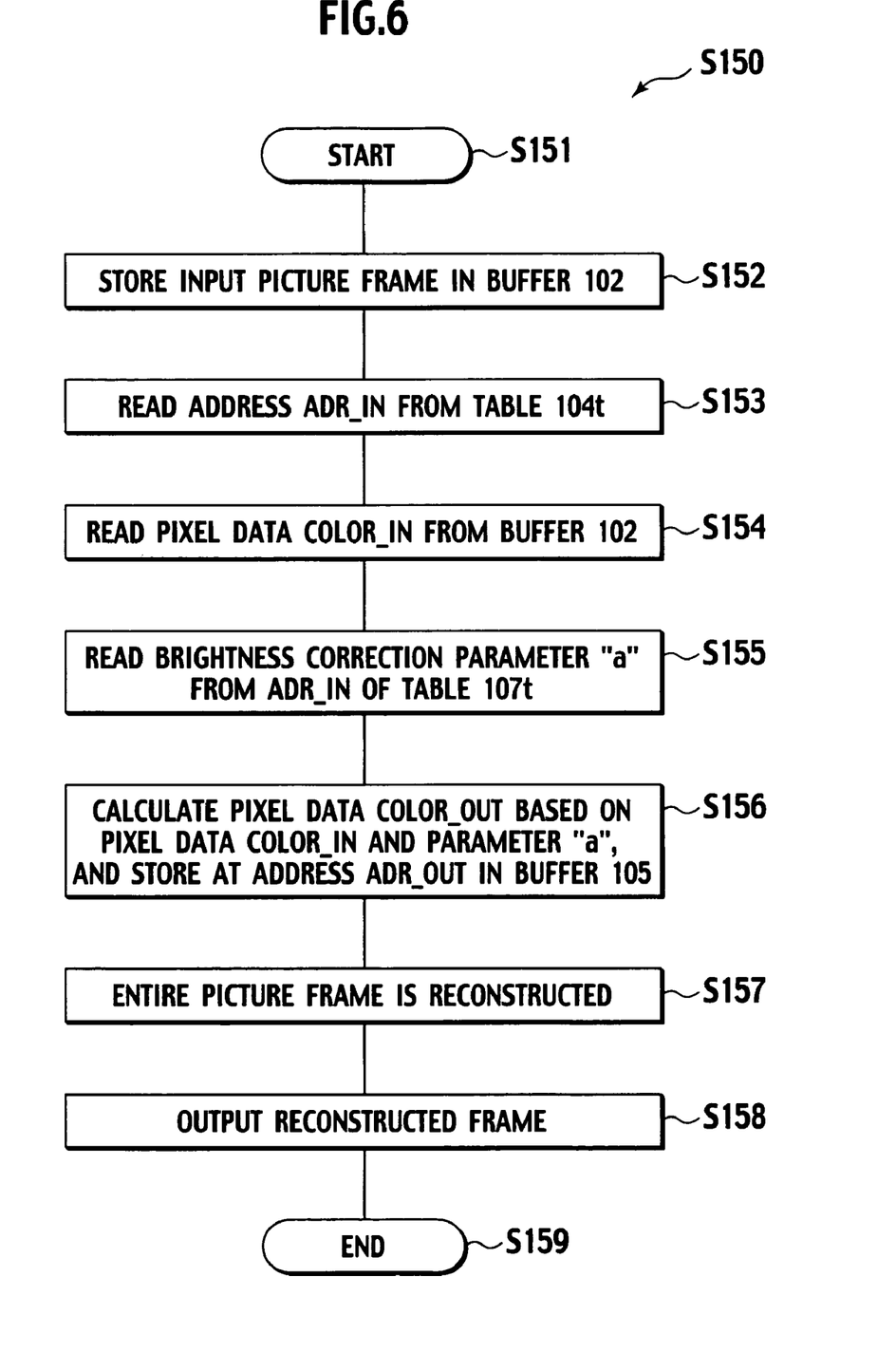
FIG. 6 is a flowchart of control actions to be conducted by a CPU (central processing unit) of the picture frame processor shown in FIG. 1.

There will be explained an action of the picture frame processor 108 shown in FIG. 1, with reference to a flowchart 150 in FIG. 6.

The CPU 103 stores an input picture frame from the electronic camera 101 in the input-end frame buffer 102 at step S152, and then accesses to the reconstruction table provider 104 at step S153 to obtain an address adr$_{in}$ from a look-up cell of the reconstruction table 104$t$ required for accessing to the input-end frame buffer 102.

The CPU 103 accesses to the input-end frame buffer 102 at step S154, to read a pixel data color$_{in}$ therefrom by using the obtained address adr$_{in}$. Simultaneously, the CPU 103 passes the obtained address adr$_{in}$ to the brightness correction parameter provider 107.

At step S155, the brightness correction parameter provider 107 uses the obtained address adr$_{in}$ for the input-end frame buffer 102 to read a previously stored brightness correction parameter "a" from a corresponding look-up cell of the brightness correction parameter table 107$t$, and returns it to the CPU 103.

At step S156, the CPU 103 calculates a pixel data color$_{out}$ based on the pixel data color$_{in}$ and the brightness correction parameter "a", and stores the pixel data color$_{out}$ in a corresponding output pixel at an address adr$_{out}$ in the output-end frame buffer 105.

At step S157, the reconstruction process is completed for all output pixels in the output-end frame buffer 105, and the output picture frame is reconstructed in its entirety. Note that it is possible to once store all output pixels in a peripheral memory, and to thereafter read them and store in the output-end frame buffer 105 to obtain a reconstructed output picture frame.

Thereafter, at step S158, the CPU 103 conducts processing for outputting a whole or part of the contents of the output-end frame buffer 105, thereby outputting a commensurate output picture frame to the display 106. The output processing in this respect is known in the field of digital processing of picture frame, and thus the details thereof are omitted.

According to the picture frame reconstruction process as described above, there is provided a scheme for conducting brightness correction of an input picture frame by prescribed brightness correction parameters "a" to generate an output picture frame.

There will be explained effects of the first embodiment.

According to this embodiment, the pixel data color$_{in}$ for the input picture frame stored in the input-end frame buffer 102 are independently corrected in brightness for each input pixel data color$_{in}$ by using a plurality of brightness correction parameters "a" previously stored in the brightness correction parameter table 107$t$ of the brightness correction parameter provider 107, thereby conducting an optimum brightness correction for each input pixel data color$_{in}$. This enables previous setting and storing of brightness correction parameters such as commensurately with the properties of the electronic camera 101 as an input device and the display 106 as an output device, to thereby freely correct an insufficient brightness of part of an input picture frame, thereby enabling a brightness of an output picture frame to be kept within a certain range, with an improved viewability of the output picture frame. Further, it becomes also possible to reconstruct an input picture frame into an output picture frame optimized as a whole, thereby enabling generation of the easy-to-view output picture frame.

Second Embodiment

Figure 7:
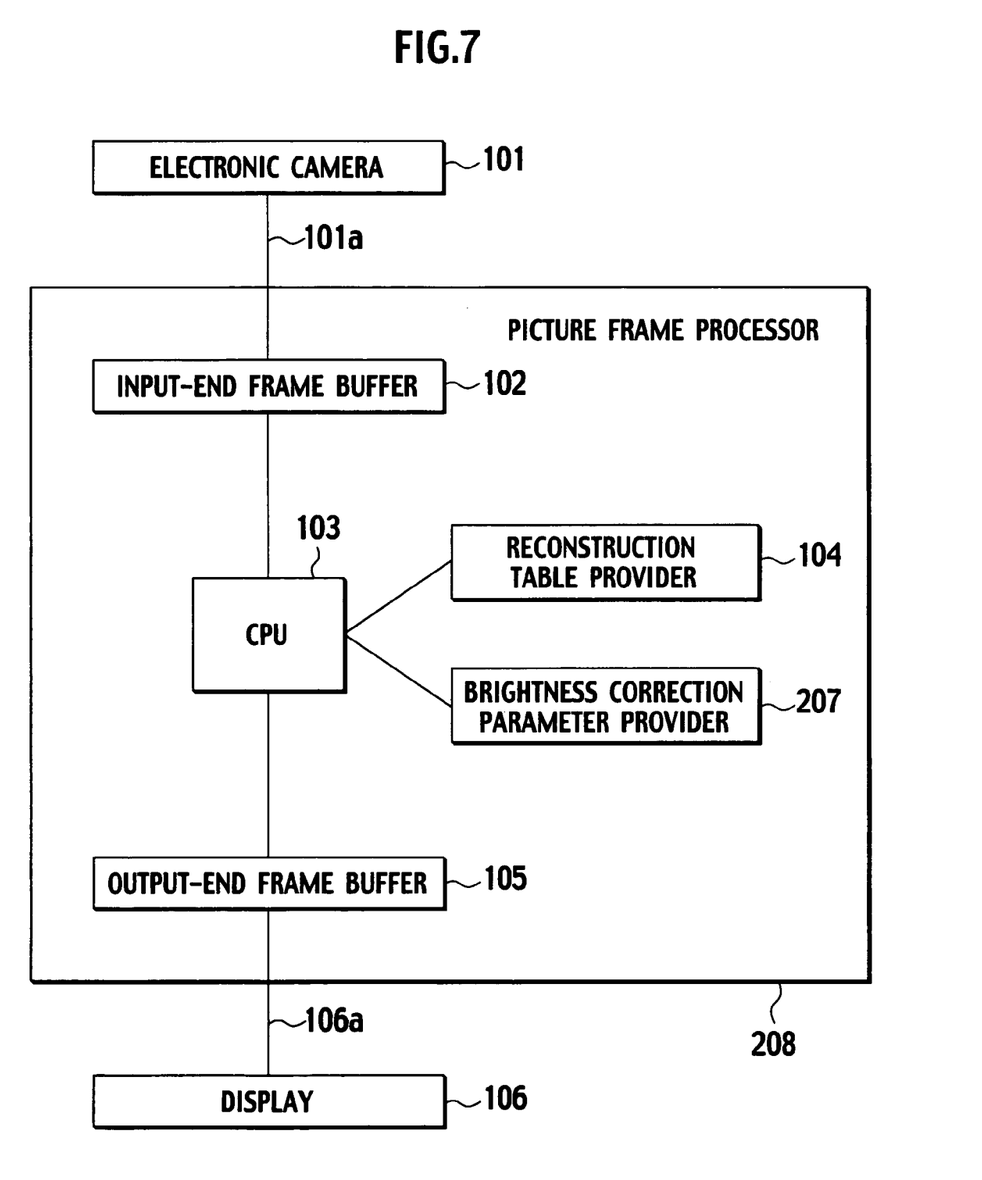
FIG. 7 is a block diagram of a frame processing system according to a second embodiment of the invention.

FIG. 7 shows a frame processing system according to a second embodiment of the present invention.

The frame processing system includes the brightness correction parameter provider constituted as a brightness correction parameter calculator 207 configured to calculate pixel coordinates x$_{in}$ and y$_{in}$ from an argument address adr$_{in}$ passed from the CPU 103. Here, x$_{in}$ and Y$_{in}$ of each address adr$_{in}$ can be represented by a residue part and an integer part of an equation "adr$_{in}$ modulo X$_{max\_in}$", respectively. For example, when the argument address adr$_{in}$ is 101 and the X$_{max\_in}$ is 10, x$_{in}$ has a value of 1 and y$_{in}$ has a value of 10.

The brightness correction parameter calculator 207 has a reference point represented by coordinates (x$_{base}$, y$_{base}$). These coordinates may be (X$_{max\_in}$/2, Y$_{max\_in}$/2) for a central point of the input-end frame buffer 102. The brightness correction parameter calculator 207 is configured to obtain a direct distance L connecting between each pixel represented by coordinates ($x_{\_in}$, $y_{\_in}$) and the reference point represented by the coordinates ($x_{\_base}$, $y_{\_base}$), and use a function f(L) including the direct distance L as an argument to thereby obtain a calculation result as a brightness correction parameter "a" which is returned to the CPU 103.

The manner, where a brightness of a pixel data color$_{\_in}$ is pixelwise corrected in the CPU 103 by a corresponding brightness correction parameter "a", is the same as that in the first embodiment.

Figure 8:
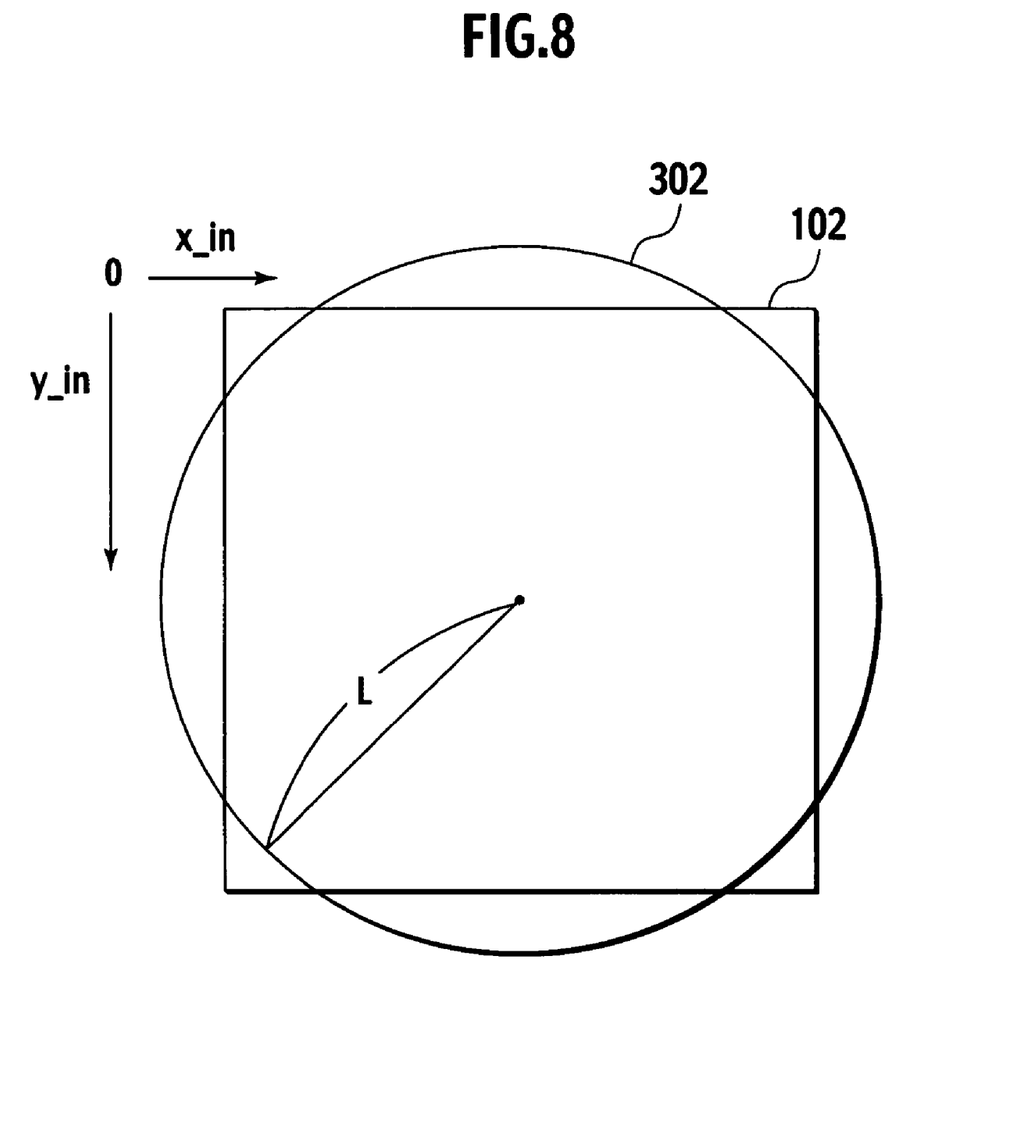
FIG. 8 is a diagram of a circular input frame overlapped with a square storage region of an input-end frame buffer of a picture frame processor of the frame processing system shown in FIG. 7.

FIG. 8 illustrates a relationship between the input-end frame buffer and an input picture frame. This example shows a circular frame 302 input via super-wide-angle lens, which is input into the input-end frame buffer 102 having a square storage region or pixel region. The storage region of the input-end frame buffer 102 is square and has an aspect ratio of 1, so that also the circular input frame 302 is unchangedly stored in the input-end frame buffer 102 at an aspect ratio of 1 on the coordinates.

Figure 10:
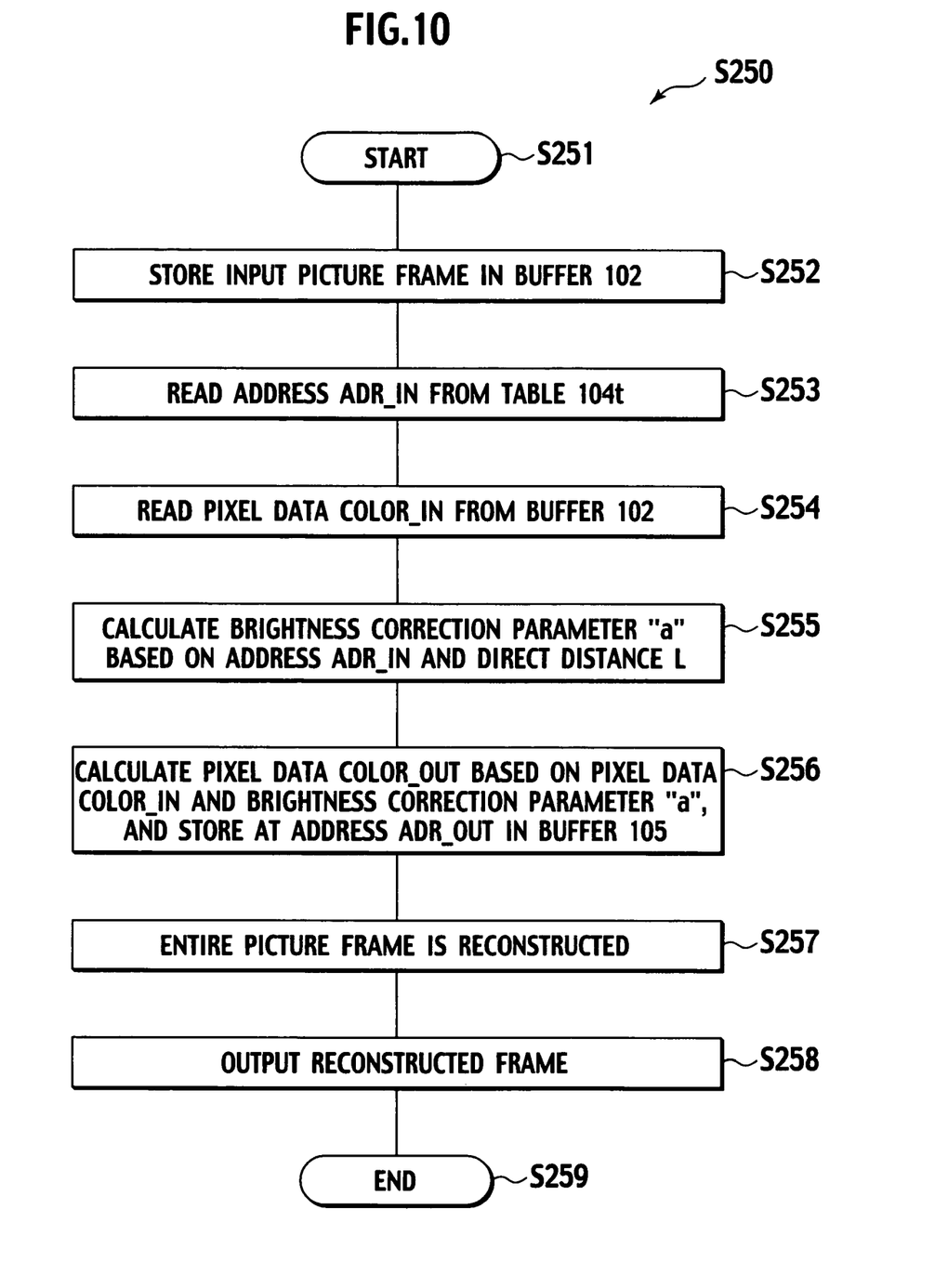
FIG. 10 is a flowchart of control actions to be conducted by a central processing unit (CPU) of the picture frame processor shown in FIG. 7.

There will be explained an action of the picture frame processor 208 shown in FIG. 7, with reference to a flowchart 250 in FIG. 10.

The CPU 103 stores an input picture frame from the electronic camera 101 in the input-end frame buffer 102 at step S252, and then accesses to the reconstruction table provider 104 at step S253 to obtain an address adr$_{\_in}$ from a look-up cell of the reconstruction table 104t required for accessing to the input-end frame buffer 102.

The CPU 103 accesses to the input-end frame buffer 102 at step S254, to read a pixel data color$_{\_in}$ therefrom by using the obtained address adr$_{\_in}$. Simultaneously, the CPU 103 passes the obtained address adr$_{\_in}$ to the brightness correction parameter calculator 207.

At step S255, the brightness correction parameter calculator 207 uses the obtained address adr$_{\_in}$ for the input-end frame buffer 102 to calculate a brightness correction parameter "a" from a direct distance L, and returns the brightness correction parameter "a" to the CPU 103.

At step S256, the CPU 103 calculates a pixel data color$_{\_out}$ based on the pixel data color$_{\_in}$ and the brightness correction parameter "a", and stores the pixel data color$_{\_out}$ in a corresponding output pixel at an address adr$_{\_out}$ in the output-end frame buffer 105.

At step S257, the reconstruction process is completed for all output pixels in the output-end frame buffer 105, and the output picture frame is reconstructed in its entirety.

Thereafter, at step S258, the CPU 103 conducts processing for outputting a whole or part of the contents of the output-end frame buffer 105, thereby outputting a commensurate output picture frame to the display 106.

There will be explained effects of the second embodiment.

According to this embodiment, there can be obtained a reconstructed picture frame the reduced amount of light of which is well corrected at a lens edge of the super-wide-angle lens when the storage region of the input-end frame buffer 102 is square in shape.

In this respect, when an object is picked up by using a super-wide-angle lens for the electronic camera 101 as an input device of the picture frame processor 208, the circular picture frame input via the super-wide-angle lens has a lower amount of light at a location closer to an outer periphery of the circle due to properties of the optical lens, so that the input picture frame is typically made darker along its periphery. Thus, if the brightness of the input picture frame is uniformly corrected in its entirety, the output picture frame is also made darker along its periphery and thus results in a difficult-to-view picture frame. Nonetheless, correcting the brightness of pixels of such an input picture frame commensurately with a direct distance L from one point of the picture frame (such as a central point of the picture frame) to the pixels, allows obtainment of an output picture frame which is excellent in brightness along its peripheral portion.

Further, although the brightness correction parameter table 107t of the brightness correction parameter provider 107 of the first embodiment has required a memory region corresponding to the number of pixels of the input-end frame buffer 102, the brightness correction parameter calculator 207 need not have a memory region for storing brightness correction parameters therein. Additionally, since brightness correction parameters of pixels are determined by direct distances L, respectively, the brightness correction parameters can be obtained by a simple calculation. Note that it is possible to use a town street distance along a pixel matrix, thereby further facilitating the calculation.

Namely, this embodiment makes it possible to brightly correct only dark pixels due to an insufficient amount of light along a lens periphery of a super-wide-angle lens, and to omit a memory for holding brightness correction parameters therein, thereby enabling an improved viewability of an output picture frame at a reduced cost.

Figure 9:
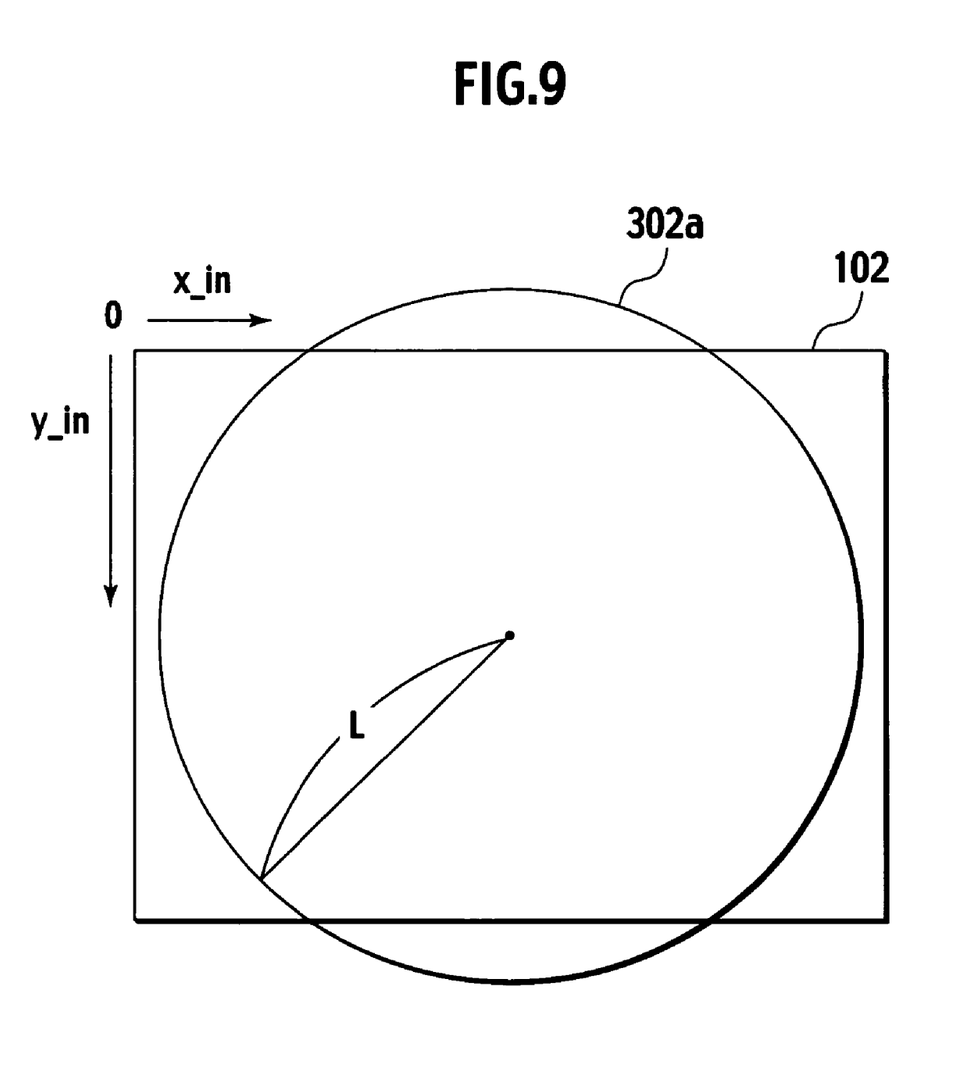
FIG. 9 is a diagram of a circular input frame overlapped with a rectangular storage region of an input-end frame buffer according to a modification of the second embodiment.

Note that even when the input-end frame buffer 102 has a rectangular storage region as illustrated in FIG. 9, there can be obtained the same effect as the second embodiment, insofar as the input-end frame buffer 102 has a storage region which corresponds to one pixel of an input picture frame and which has an aspect ratio of 1 so that the input-end frame buffer 102 stores therein a circular input frame 302a as it is.

Third Embodiment

Figure 11:
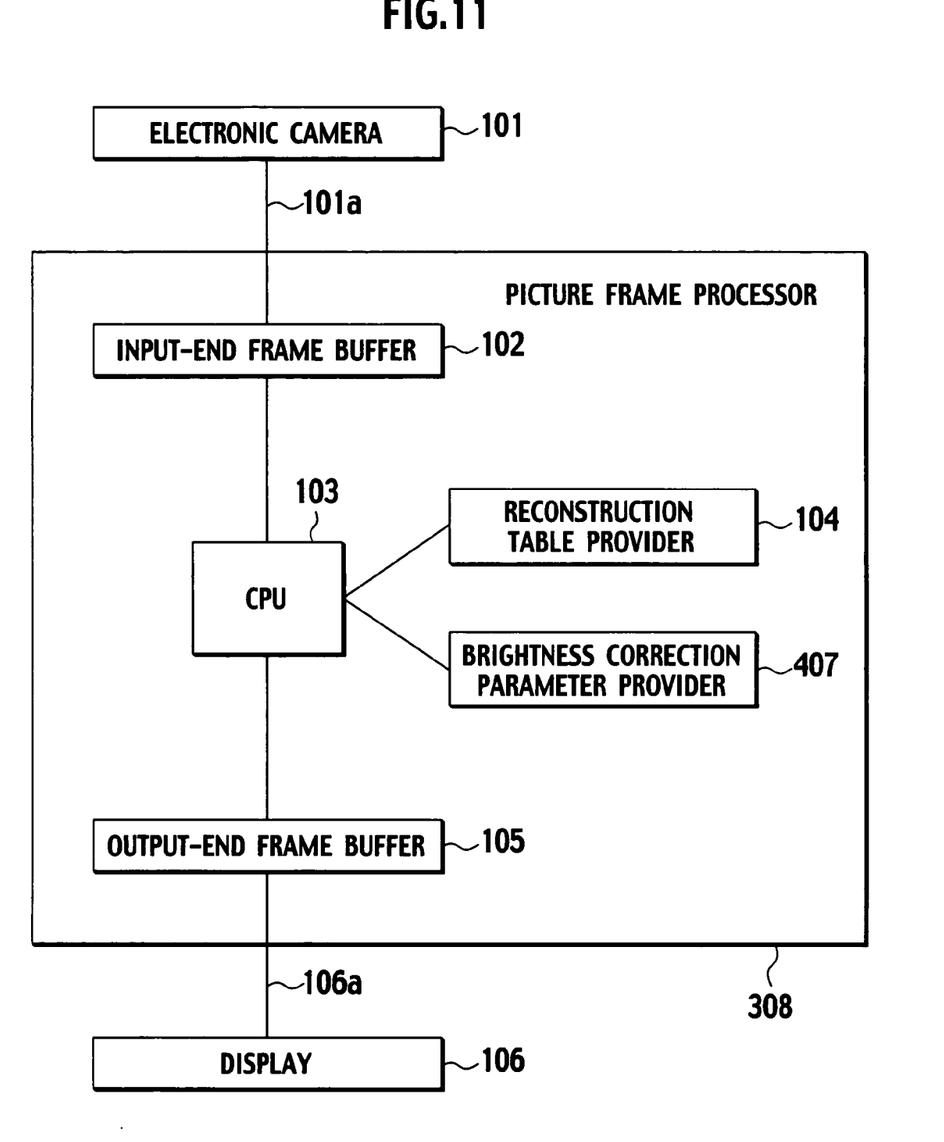
FIG. 11 is a block diagram of a frame processing system according to a third embodiment of the invention.

FIG. 11 shows a frame processing system according to a third embodiment of the present invention.

The frame processing system includes the brightness correction parameter provider constituted as a brightness correction parameter calculator 307 configured to calculate pixel coordinates $x_{\_in}$ and $y_{\_in}$ from an argument address adr$_{\_in}$ passed from the CPU 103.

The brightness correction parameter calculator 307 is configured to obtain a pixel location defined by: a direct distance L between each pixel and a reference point; and an angle θ formed between (i) a line connecting between the pixel and the reference point, and (ii) a line parallel to a horizontal coordinate axis; and to use a function f(L, θ) including the direct distance L and angle θ as arguments to thereby obtain a calculation result as a brightness correction parameter "a" which is returned to the CPU 103.

The manner, where a brightness of a pixel data color$_{\_in}$ is pixelwise corrected in the CPU 103 by a corresponding brightness correction parameter "a", is the same as that in the first embodiment.

Figure 12:
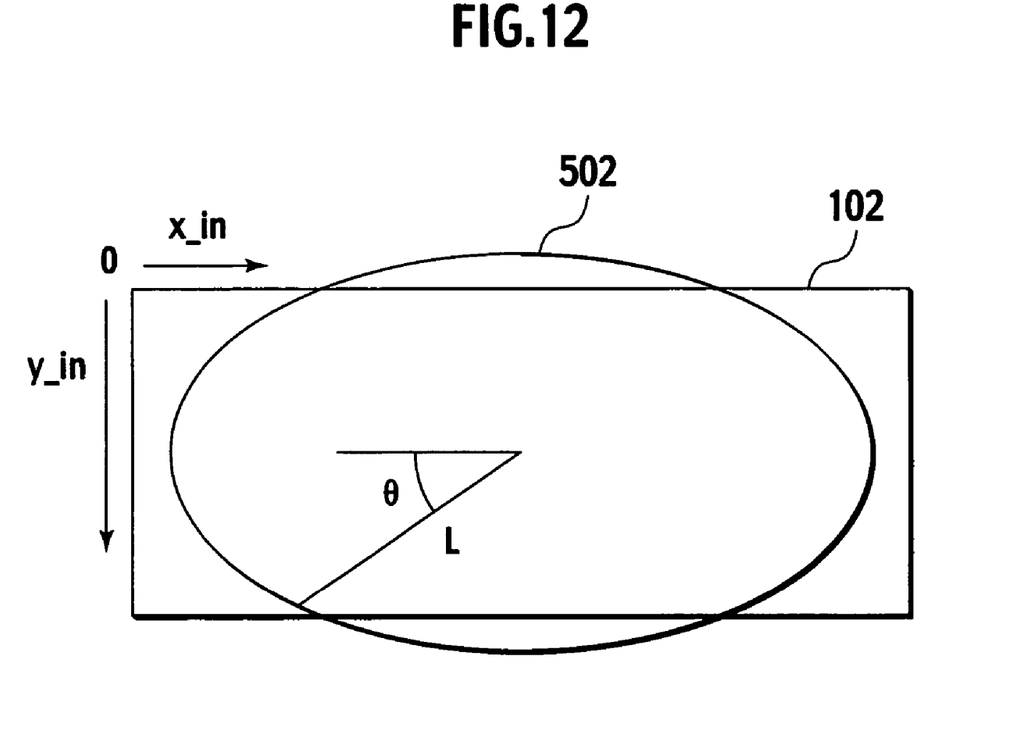
FIG. 12 is a diagram of an elliptic input frame overlapped with a rectangular storage region of an input-end frame buffer of a picture frame processor of the frame processing system shown in FIG. 11.

FIG. 12 illustrates a relationship between the input-end frame buffer and an input picture frame. This example shows an elliptic input frame 502 input via super-wide-angle lens, which is input into the input-end frame buffer 102 having a laterally elongated rectangular storage region. In the coordination system of pixels, the circular input picture frame appears as a laterally elongated elliptic picture frame.

Figure 13:
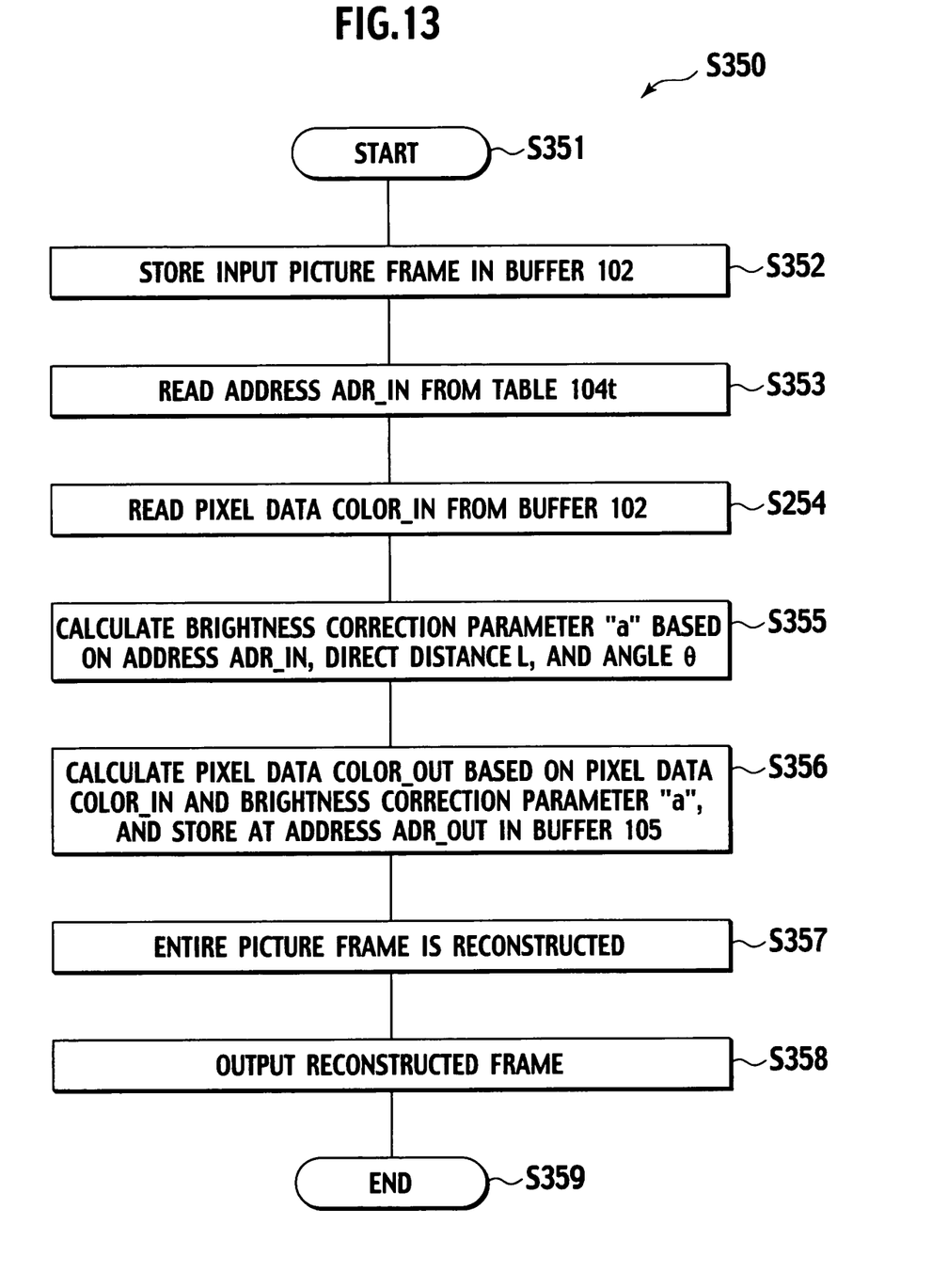
FIG. 13 is a flowchart of control actions to be conducted by a central processing unit of the picture frame processor shown in FIG. 11.

There will be explained an action of the picture frame processor 308 shown in FIG. 11, with reference to a flowchart 350 in FIG. 13.

The CPU 103 stores an input picture frame from the electronic camera 101 in the input-end frame buffer 102 at step S352, and then accesses to the reconstruction table provider 104 at step S353 to obtain an address adr$_{\_in}$ from a look-up cell of the reconstruction table 104*t* required for accessing to the input-end frame buffer 102.

The CPU 103 accesses to the input-end frame buffer 102 at step S354, to read a pixel data color$_{\_in}$ therefrom by using the obtained address adr$_{\_in}$. Simultaneously, the CPU 103 passes the obtained address adr$_{\_in}$ to the brightness correction parameter calculator 307.

At step S355, the brightness correction parameter calculator 307 uses the obtained address adr$_{\_in}$ for the input-end frame buffer 102 to calculate a brightness correction parameter "a" from a direct distance L and an angle θ, and returns the brightness correction parameter "a" to the CPU 103.

At step S356, the CPU 103 calculates a pixel data color$_{\_out}$ based on the pixel data color$_{\_in}$ and the brightness correction parameter "a", and stores the pixel data color$_{\_out}$ in a corresponding output pixel at an address adr$_{\_out}$ in the output-end frame buffer 105.

At step S357, the reconstruction process is completed for all output pixels in the output-end frame buffer 105, and the output picture frame is reconstructed in its entirety.

Thereafter, at step S358, the CPU 103 conducts processing for outputting a whole or part of the contents of the output-end frame buffer 105, thereby outputting a commensurate output picture frame to the display 106.

There will be explained effects of the third embodiment.

This embodiment is configured to determine a brightness correction parameter "a" by a direct distance L and an angle θ, and is thus effective in reconstructing dark pixels due to an insufficient amount of light along a lens periphery of a super-wide-angle lens when the input-end frame buffer 102 has a laterally elongated rectangular storage region. Namely, when an object is picked up by using a super-wide-angle lens for the electronic camera 101 as an input device of the picture frame processor 308, the picture frame input via the super-wide-angle lens is made into a laterally elongated elliptic frame having a lower amount of light and thus having a lower brightness at a location closer to an outer periphery of the frame. It is thus effective to apply a brightness correction commensurately with a direct distance L and an angle θ of each pixel.

The brightness correction parameter calculator 307 is more advantageous than the brightness correction parameter provider 107 of the first embodiment, since the former need not have a memory region for holding brightness correction parameters therein. Additionally, the brightness correction parameters "a" for input pixel data can be obtained by a simple calculation.

Namely, this embodiment makes it possible to brightly correct only dark pixels due to an insufficient amount of light along a lens periphery of a super-wide-angle lens even when the input-end frame buffer has a rectangular storage region, and to omit a memory for storing brightness correction parameters therein, thereby enabling an improved viewability of an output picture frame at a reduced cost.

The first through third embodiments described above may be appropriately combined with each other in partial components thereof.

The contents of Japanese Patent Application No. 2004-203069, filed in the Japanese Patent Office on Jul. 9, 2004, are incorporated herein by reference.

Although the present invention has been described based on the embodiments, the present invention is not limited thereto, and various modifications may be made thereto without departing from the spirit or scope of the present invention.

What is claimed is:

1. A frame processing system comprising:
   an interface inputting a first picture frame from an electronic camera;
   a picture frame processor reconstructing at least part of the first picture frame into a second picture frame, making a pixelwise correction of brightness; and
   another interface outputting at least part of the second picture frame to a display,
   wherein the picture frame processor comprises:
   an input-end frame buffer holding the first picture frame therein as an input picture frame;
   an output-end frame buffer holding the second picture frame therein as an output picture frame;
   a reconstruction table provider providing a reconstruction table having an address to access to an output pixel of the output-end frame buffer and an address, which corresponds to the address to the output pixel, to access to an input pixel of the input-end frame buffer;
   a brightness correction parameter provider providing a brightness correction parameter table having the address to access to the input pixel of the input-end frame buffer and a brightness correction parameter corresponding to the address to access to the input pixel of the input-end frame buffer; and
   a processing unit looking up the reconstruction table to obtain the address to access to the input pixel based on the address to access to the output pixel of the output-end frame buffer and looking up the brightness correction parameter table to obtain the brightness correction parameter based on the obtained address to access to the input pixel of the input-end frame buffer, thereby obtaining a pixel data of the input pixel from the input-end frame buffer and applying the obtained brightness correction parameter to correct the brightness of the obtained pixel data.

2. The frame processing system as claimed in claim 1, wherein the brightness correction parameter provider comprises a memory storing prescribed brightness correction parameters therein.

3. The frame processing system as claimed in claim 1, wherein the brightness correction parameter provider comprises a parameter calculator calculating the brightness correction parameter.

4. The frame processing system as claimed in claim 3, wherein the parameter calculator determines the brightness correction parameter depending on a distance between a corresponding pixel of the input picture frame and a reference point.

5. The frame processing system as claimed in claim 3, wherein the parameter calculator determines the brightness correction parameter depending on a location of a corresponding pixel of the input picture frame and a distance between the corresponding pixel and a reference point.

6. The frame processing system as claimed in claim 5, wherein the location of the corresponding pixel is defined as an angle formed between: a reference line passing through the reference point; and a line connecting between the reference point and the corresponding pixel.

7. A frame processing system comprising:
   an interface inputting a first picture frame from an electronic camera;
   picture frame processing means for reconstructing at least part of the first picture frame into a second picture frame, making a pixelwise correction of brightness; and
   another interface outputting at least part of the second picture frame to a display, wherein the picture frame processing means comprises:

an input-end frame buffer holding the first picture frame therein as an input picture frame;

an output-end frame buffer holding the second picture frame therein as an output picture frame;

a reconstruction table provider providing a reconstruction table having an address to access to an output pixel, of the output-end frame buffer and an address, which corresponds to the address to the output pixel to access to an input pixel of the input-end frame buffer;

a brightness correction parameter provider providing a brightness correction parameter table having the address to access to the input pixel of the input-end frame buffer and a brightness correction parameter corresponding to the address to access to the input pixel of the input-end frame buffer; and a processing unit looking up the reconstruction table to obtain the address to access to the input pixel based on the address to access to the output pixel of the output-end frame buffer and looking up the brightness correction parameter table to obtain the brightness correction parameter based on the obtained address to access to the input pixel of the input-end frame buffer, thereby obtaining a pixel data of the input pixel from the input-end frame buffer and applying the obtained brightness correction parameter to correct the brightness of the obtained pixel data.

8. A frame processing method, comprising:

inputting a first picture frame from an electronic camera;

reconstructing at least part of the first picture frame into a second picture frame, making a pixelwise correction of brightness; and outputting at least part of the second picture frame to a display, wherein in reconstructing at least part of the first picture frame into the second picture frame, holding the first picture frame in an input-end frame buffer as an input picture frame;

holding the second picture frame in an output-end frame buffer as an output picture frame;

providing a reconstruction table having an address to access to an output pixel of the output-end frame buffer and an address, which corresponds to the address to the output pixel, to access to an input pixel of the input-end frame buffer;

providing a brightness correction parameter table having the address to access to the input pixel of the input-end frame buffer and a brightness correction parameter corresponding to the address to access to the input pixel of the input-end frame buffer; and looking up the reconstruction table to obtain the address to access to the input pixel based on the address to access to the output pixel of the output-end frame buffer and looking up the brightness correction parameter table to obtain the brightness correction parameter based on the obtained address to access to the input pixel of the input-end frame buffer, thereby obtaining a pixel data of the input pixel from the input-end frame buffer and applying the obtained brightness correction parameter to correct the brightness of the obtained pixel data.

9. The frame processing method as claimed in claim 8 further comprising having a given parameter for the pixelwise correction of brightness.

10. The frame processing method as claimed in claim 8 further comprising calculating a parameter for the pixelwise correction of brightness.

* * * * *

UNITED STATES PATENT AND TRADEMARK OFFICE
CERTIFICATE OF CORRECTION

| | | |
|---|---|---|
| PATENT NO. | : 7,619,652 B2 | Page 1 of 1 |
| APPLICATION NO. | : 11/176356 | |
| DATED | : November 17, 2009 | |
| INVENTOR(S) | : Ken Oizumi | |

It is certified that error appears in the above-identified patent and that said Letters Patent is hereby corrected as shown below:

ON THE TITLE PAGE;

(54) FRAME PROCESSING AND FRAME PROCESSING METHOD should read

-- FRAME PROCESSING SYSTEM AND FRAME PROCESSING METHOD --.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,619,652 B2  Page 1 of 1
APPLICATION NO. : 11/176356
DATED : November 17, 2009
INVENTOR(S) : Ken Oizumi It is certified that error appears in the above-identified patent and that said Letters Patent is hereby corrected as shown below:

ON THE TITLE PAGE, Item (54) and at Column 1, lines 1 and 2, title,

FRAME PROCESSING AND FRAME PROCESSING METHOD should read

-- FRAME PROCESSING SYSTEM AND FRAME PROCESSING METHOD --.

This certificate supersedes the Certificate of Correction issued June 1, 2010.

Signed and Sealed this

Twenty-ninth Day of June, 2010

David J. Kappos
*Director of the United States Patent and Trademark Office*